United States Patent [19]

Iida

[11] 4,059,197
[45] Nov. 22, 1977

[54] SPARE TIRE CARRIER

[75] Inventor: Hiroshi Iida, Kariya, Japan

[73] Assignee: Manno Kogyo Company, Limited, Japan

[21] Appl. No.: 628,784

[22] Filed: Nov. 4, 1975

[30] Foreign Application Priority Data

| Feb. 1, 1975 | Japan | 50-13762 |
| May 20, 1975 | Japan | 50-60066 |
| Feb. 8, 1975 | Japan | 50-16546 |
| May 17, 1975 | Japan | 50-58841 |

[51] Int. Cl.² ............................................. B62D 43/04
[52] U.S. Cl. .................................... 214/451; 74/804; 70/259
[58] Field of Search ................................ 254/169, 171; 224/42.21, 42.23, 42.12, 42.24, 42.25, 42.26; 74/394, 804; 214/451, 454; 70/258, 259, 260

[56] References Cited

U.S. PATENT DOCUMENTS

| 1,993,744 | 3/1935 | Morison | 254/169 |
| 3,204,330 | 9/1965 | Pomernacki | 74/394 |
| 3,372,821 | 3/1968 | Podhajsky | 224/42.25 X |
| 3,608,391 | 9/1971 | Bargstedt et al. | 74/394 |
| 3,856,167 | 12/1974 | Yasue et al. | 224/42.23 X |

FOREIGN PATENT DOCUMENTS 1,422,000  1/1976  United Kingdom ............. 224/42.21

Primary Examiner—Robert J. Spar
Assistant Examiner—Donald W. Underwood
Attorney, Agent, or Firm—Karl W. Flocks

[57] ABSTRACT

A spare tire carrier utilizing an eccentric gear mechanism for hoisting a spare tire, in which said mechanism comprises means for restricting the movement of the external gear such that the internal gear driven by the external gear makes the pilgrim-step motion, whereby the mechanism may be positively prevented from the accidental reversal movement so as to prevent the drop of the spare tire.

6 Claims, 23 Drawing Figures

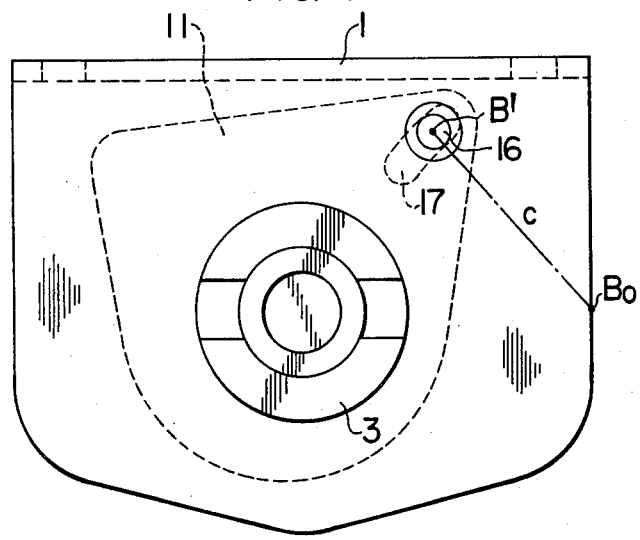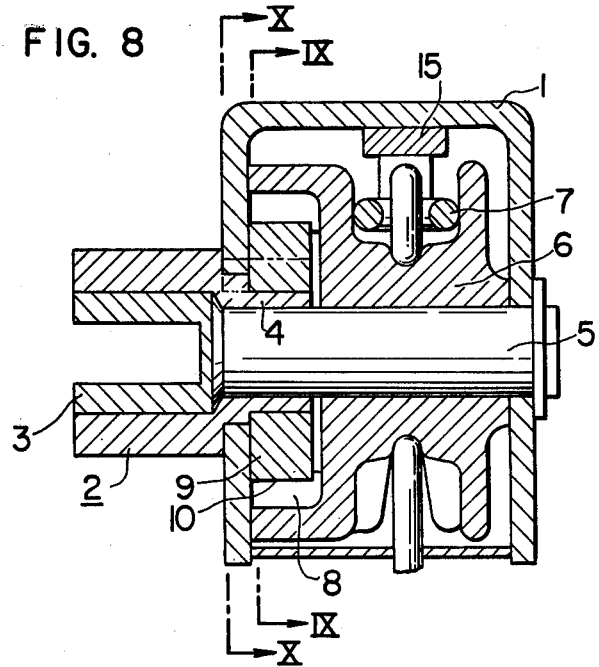

SPARE TIRE CARRIER

The present invention relates to a spare tire carrier utilizing an eccentric gear mechanism.

The eccentric gear mechanism which provides the self-locking action is widely used in the chain hoisting devices because the sprockets or chain wheels are not permitted to rotate in the direction for lowering the load under the pull thereof unless the winding shaft or drum is reversed in direction. However, the reversal of rotation of the sprockets or chain wheels tends to occur when the hoisting devices are subjected to the vibration for a long time.

One of the objects of the present invention is to provide a spare tire carrier which incorporates an eccentric gear and is yet very simple in construction and which may be operated with a jack handle to lift and hold the spare tire under an automotive vehicle body.

Another object of the present invention is to provide a spare tire carrier which incorporates an eccentric gear in such a way that it makes the pilgrim-step motion so that even when the spare tire carrier is subjected to the vibration or impact during the travel of the automotive vehicle, the reversal rotation of the spare tire carrier may be prevented, whereby the spare tire may be securely and safety held in position.

In this specification, the term "pilgrim-step motion" is used to refer to the motion in which while the input shaft is being rotated in one direction, the output shaft after it has been rotated through a predetermined angle is temporarily rotated in the direction opposite to that in which it has been rotated. The eccentric gear incorporated in the present invention produce this pilgrim-step motion so that even when a force acts upon the spare tire to lower the same and to cause the reversal rotation of the sprocket or chain wheel, the reversal rotation may be prevented, whereby the spare tire may be securely held in position.

Briefly stated, in order to attain the above and other objects, the present invention provides a spare tire carrier comprising a casing, a shaft having a handle engaging portion at one end thereof and rotatably carried by said casing, an eccentric cam fastened to said shaft, an external gear rotatably fitted over said eccentric cam, said external gear being not only rotatable about its axis but also revolvable about the center of said shaft, an internal gear rotatably mounted on said shaft and in mesh with said external gear, means for restricting the motion of said external gear such that as said shaft is rotated said external gear causes the pilgrim-step motion of said internal gear, and means operatively connected to said internal gear for hoisting a spare tire.

The above and other objects, features and advantages of the present invention will become more apparent from the following description of some preferred embodiments thereof taken in conjunction with the accompanying drawing.

FIG. 7 is a left side view thereof;

FIG. 8 is a longitudinal sectional view of the fourth embodiment of the present invention;

Same reference numerals and characters are used to denote similar parts throughout the figures.

Figure 1:
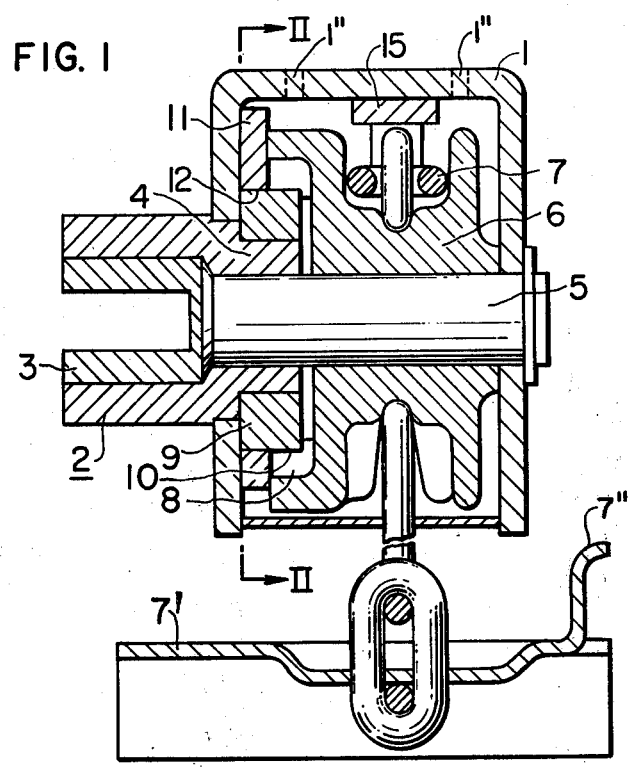
FIG. 1 is a longitudinal sectional view of the first embodiment of the present invention.
Figure 2:
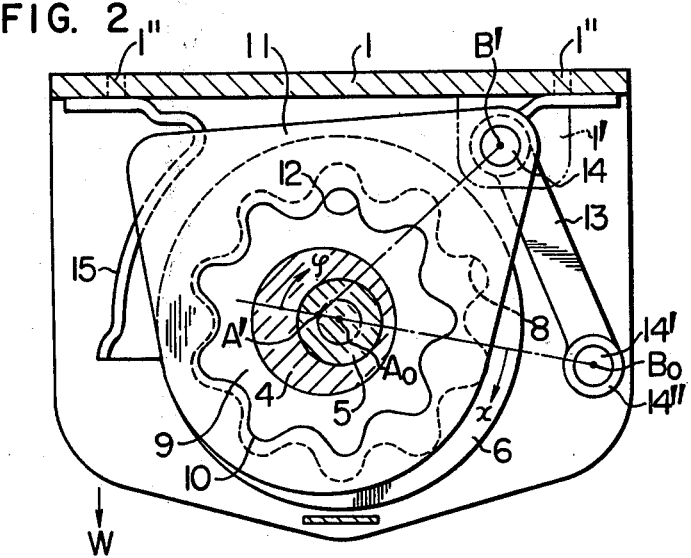
FIG. 2 is a transverse sectional view thereof taken along the line II—II of FIG. 1.
Figure 3:
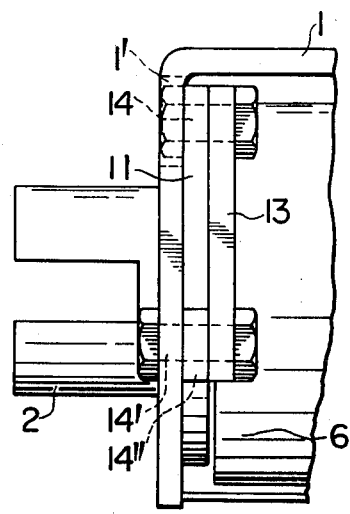
FIG. 3 is a partial front view of the first embodiment.

In the first embodiment shown in FIGS. 1, 2 and 3, a rocking plate and a link are used to produce the pilgrim-step motion. In FIGS. 1, 2 and 3, reference numeral 1 denotes a casing fixed to the bottom of a vehicle body (not shown) with bolts through holes 1", the casing carrying a shaft including a handle engaging portion 3, an eccentric cam 4 and a shaft portion 5; 6, a chain wheel or sprocket over which runs the chain 7 which suspends a spare tire holding device 7'; 8, an internal gear formed integral with and coaxially of the chain wheel 6 and in mesh with the right half portions (in FIG. 1) of the teeth 10 of an external gear 9 slidably fitted over the eccentric cam 4, the number of the teeth of the internal gear 8 being slightly larger than that of the external gear 9; 11, a rocking plate whose internally threaded teeth 12 are in mesh with the left half portions (in FIG. 1) of the external gear 9 for rotation in unison therewith through a limited angle as will be described in detail hereinafter; 13, a link whose upper end is pivoted to the rocking plate 11 at the point B' and whose lower end is pivoted with a bolt 14' to the case 1 at the point Bo, the length between the center A' of the eccentric cam 4 and the pivot point B', the length B'Bo of the link 13 and the distance between the center Ao of the chain wheel and the pivot point Bo being selected in a manner to be described in detail hereinafter; 15, a chain guide; 1', a slot formed in the case 1 so as to permit the free movement of the bolt 14; and 14", a collar for the bolt 14'.

Figure 4:
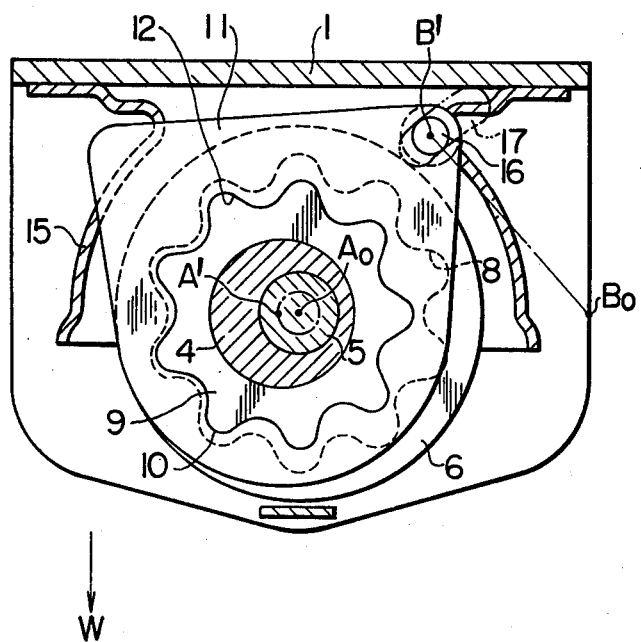
FIG. 4 is a transverse sectional view of the second embodiment of the present invention.
Figure 5:
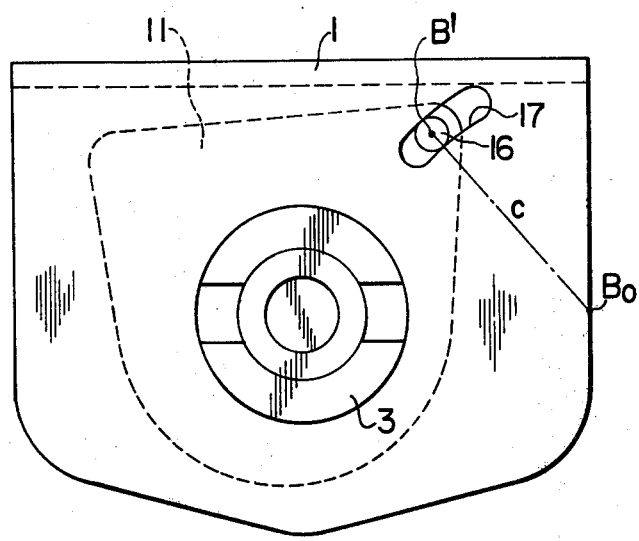
FIG. 5 is a left side view thereof.

The second embodiment of the present invention shown in FIGS. 4 and 5 is substantially similar in construction to the first embodiment except that instead of being coupled to the case 1 through the link 13, the rocking plate 11 has a pin 16 slidably fitted into an arcuate guide slot 17 formed through the case 1. That is, the pin 16 is extended from the rocking plate 11 at the point B' and is slidably fitted into the arcuate guide slot 17 whose center coincides with the point Bo. The positions of both the points B' and Bo relative to the center A' of the eccentric cam 4 are same with those in the first embodiment.

Figure 6:
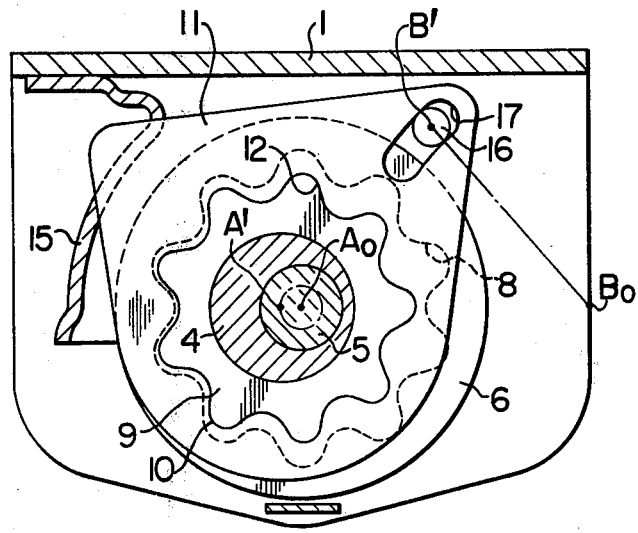
FIG. 6 is a transverse sectional view of the third embodiment of the present invention.

The third embodiment in accordance with the present invention shown in FIGS. 6 and 7 is substantially similar in construction to the second embodiment except that the pin 16 is extended from the case 1 and is slidably fitted into an arcuate guide slot 17 formed through the rocking plate 11.

Figure 9:
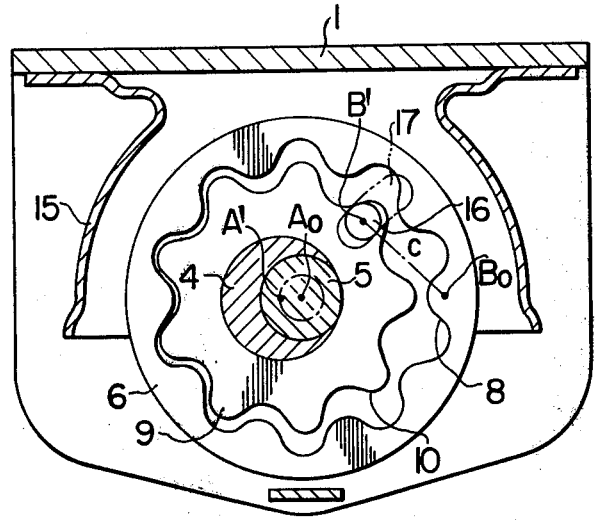
FIG. 9 is a transverse sectional view thereof taken along the line IX—IX of FIG. 8.
Figure 10:
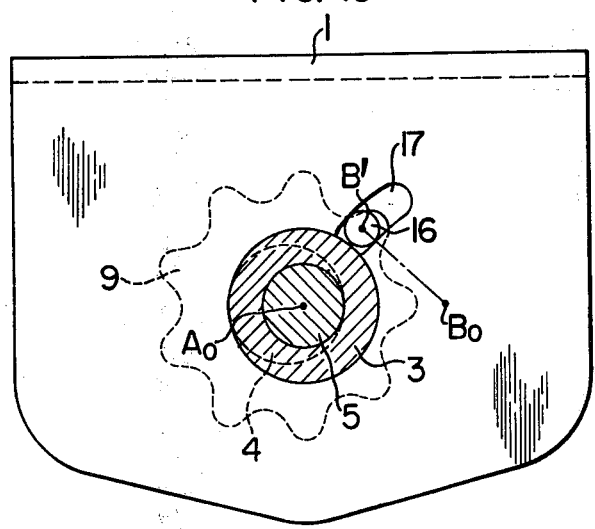
FIG. 10 is a transverse sectional view thereof taken along the line X—X of FIG. 8.

The fourth embodiment in accordance with the present invention shown in FIGS. 8, 9 and 10 is substantially similar in construction to the second and third embodiments except that the rocking plate 11 is eliminated and the pin 16 is extended from the external gear 9 at the point B' and is slidably fitted into the arcuate guide slot 17 formed through the case 1.

The distances between the points B' and Bo and between A' and B' will be determined in a manner to be described in detail hereinafter with reference to the first embodiment.

Figure 11:
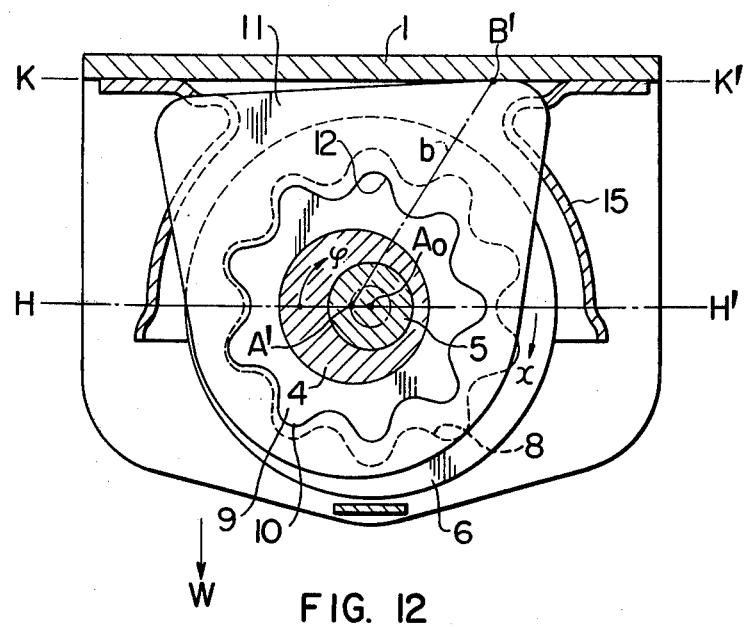
FIG. 11 is a transverse sectional view of the fifth embodiment of the present invention.

The fifth embodiment in accordance with the present invention shown in FIG. 11 is substantially similar in construction to the first embodiment except that instead of being coupled to the case 1 with the link and pivot pins the rocking plate 11 has its one end B' pressed against the upper inner surface K-K' of the case 1 under the load W. The distance between this point B' and the center A' of the eccentric cam 4 as well as the length of the shortest straight line connecting the center Ao of rotation of the shaft 2 to the upper inner surface K-K" are selected in a manner to be described in detail hereinafter.

Figure 12:
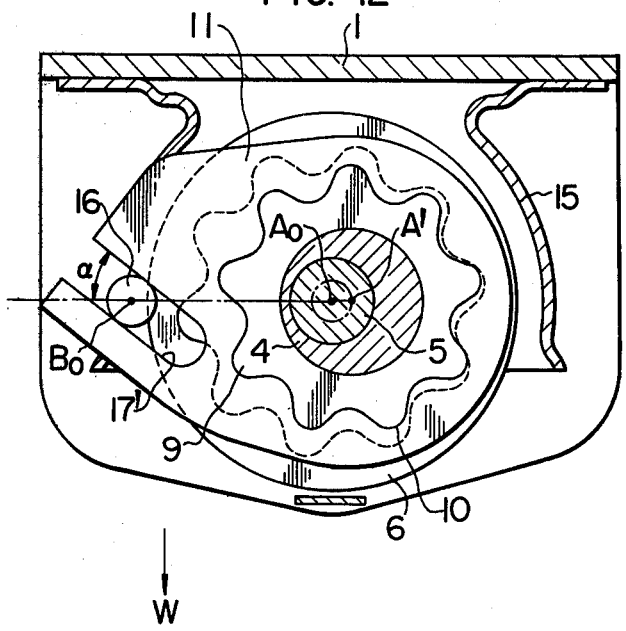
FIG. 12 is a transverse sectional view of the sixth embodiment of the present invention.

The sixth embodiment shown in FIG. 12 is substantially similar in construction to the third embodiment shown in FIGS. 6 and 7 except that instead of the arcuate guide slot 17, a straight guide slot 17' is formed through the rocking plate 11. The angle $\alpha$ between the longitudinal axis or center line of the straight guide slot 17' passing through the center Bo of the pin 16 extended from the case 1 and the line connecting between the centers Bo and Ao is selected in a manner to be described in detail hereinafter so that the pilgrim-step motion may be generated.

Figure 13:
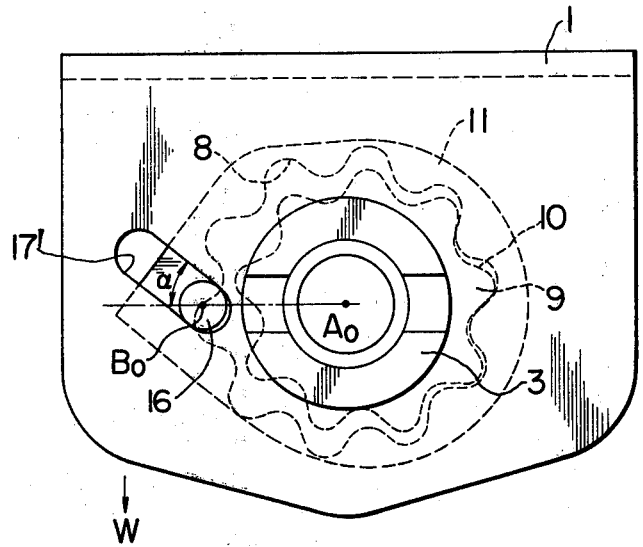
FIG. 13 is a left side view of the seventh embodiment of the present invention.

The seventh embodiment in accordance with the present invention shown in FIG. 13 is substantially similar in construction to the sixth embodiment except that the pin 16 is extended from the rocking plate 11 and is slidably fitted into the straight guide slot 17' formed through the case 1.

Next referring to FIGS. 14 and 15, the underlying principle of the first embodiment will be described in detail hereinafter. Ao is the center of rotation of the eccentric cam 4 with the eccentricity $a = \overline{AoA'}$ and of the internal gear 8; A', the center of the eccentric cam 4 and the center of rotation of the external gear 9 slidably fitted over the eccentric cam 4 and in mesh with the internal gear 8 at the point Q, the rocking plate 11 rotating in unison with the external gear 9; Bo, a point on the case, the distance $\overline{AoBo} = d$; B', a point on the rocking plate 11; c, the length of the link pivoted at the points Bo and B'; $<AoA'B' = \delta o$ when the center A' is located on the extension of the line $\overline{BoAo}$; $b = \overline{A'B'} = \overline{A_1B_1}$, where $A_1$ and $B_1$ are the center of the eccentric cam 4 and the pivot point of the rocking plate to the link, respectively, after the eccentric cam 4 has been rotated about the point Ao through an angle $\phi$; $<AoA_1B_1 = \delta$; and e, the distance between the points Bo and $A_1$.

When the center A' of the eccentric cam 4 rotates about the center Ao of rotation through $\phi$ to the point $A_1$ in the clockwise direction, the point of mesh between the external and internal gears 9 and 8 is displaced from the point Q to $Q_1$ and the angle $\chi$ of rotation in clockwise direction of the internal gear 8 is given by $$\chi = \phi - n_2/n_1 (\delta - \delta o) \quad (1)$$

where $n_1$ = number of teeth of the internal gear 8, and $n_2$ = number of teeth of the external gear 9. The reason is that when the eccentric cam 4 is rotated through $\phi$ in the clockwise direction, if the external gear 9 were not rotated with respect to the cam 4, the internal gear 8 would be rotated through $\phi$ in the clockwise direction, but the external gear 9 is rotated through $\delta - \delta o$ with rspect to the cam 4 so that it cause the internal gear 8 to rotate through $n_2/n_1(\delta - \delta o)$ in the counterclockwise direction with respect to the cam 4 and thus the internal gear 8 must be rotated through $\chi$.

Let $\delta = \alpha + \gamma$ and consider the triangle $\Delta A_1B_1Bo$. From the law of cosine, $$c^2 = b^2 + e^2 - 2be \cos \gamma$$

In like manner, for the triangle $\Delta A'B'Bo$, $$c^2 = b^2 + (a + d)^2 - 2b(a + d) \cos \delta o$$

and for the triangle $\Delta AoA_1Bo$, $$e^2 = a^2 + d^2 + 2ad \cdot \cos \phi$$

Therefore, $$\delta o = \cos^{-1} \frac{b^2 + (a + d)^2 - c^2}{2b(a + d)}$$

$$\gamma = \cos^{-1} \frac{b^2 + e^2 - c^2}{2be}$$

Figure 14:
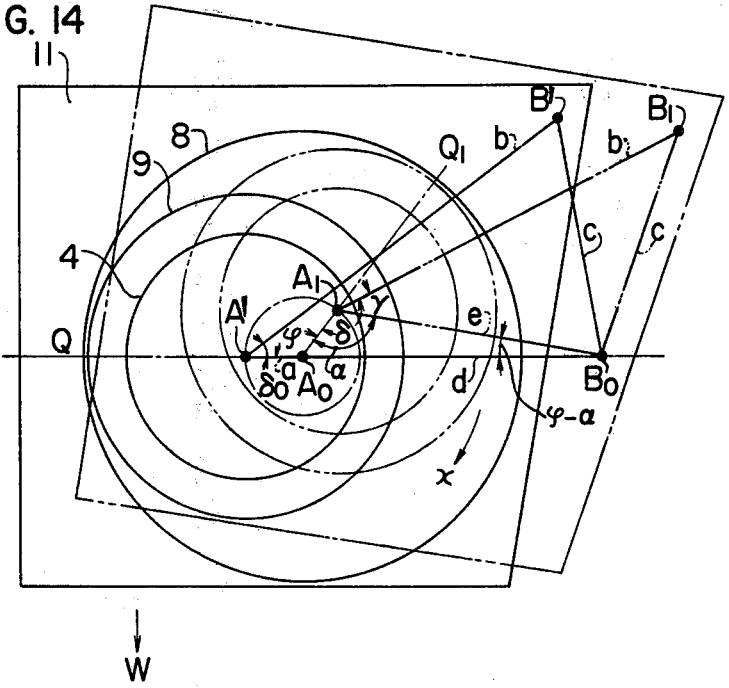
FIGS. 14 and 15 are views used for the explanation of the underlying principle of the first embodiment.

From FIG. 14, $$\tan (\phi - \alpha) = \frac{a \sin\phi}{d + a \cos\phi}$$

Therefore, $$\alpha = \phi - \tan^{-1} \frac{a \sin\phi}{d + a \cos\phi}$$

and $$\chi = \phi - \frac{n_2}{n_1} \left[ \phi - \tan^{-1} \frac{a \sin\phi}{d + a \cos\phi} + \cos^{-1} \frac{e^2 + b^2 - c^2}{2be} - \cos^{-1} \frac{b^2 + (a + d)^2 - c^2}{2b(a + d)} \right]$$

Differentiating Eq. (1) with rspect to $\phi$, we have $$\frac{d\chi}{d\phi} = 1 - \frac{n_2}{n_1} \frac{d\delta}{d\phi} = 1 - \frac{n_2}{n_1} ( \frac{d\alpha}{d\phi} + \frac{d\gamma}{d\phi} )$$

Hence, $$\frac{d\chi}{d\phi} = 1 - \frac{n_2}{n_1} \left[ 1 - \frac{a(a + d \cos\phi)}{e^2} + \quad (2) \right.$$

-continued $$\left. \frac{ad \sin\phi \, (e^2 + c^2 - b^2)}{e^2 \sqrt{4b^2 e^2 - (e^2 + b^2 - c^2)^2}} \right]$$

If the angle $\phi$ of rotation of the center $A'$ of eccentric cam 4 is such that Eq. (2) is negative, the direction of the angle $\chi$ of rotation of the internal gear 8 is different from that of the angle $\phi$ of rotation of the eccentric cam. That is, at such angle $\phi$ as above the pilgrim-step motion is produced.

In the first embodiment, $a = 3.2$ mm; $n_1 = 10$ and $n_2 = 9$. $d$ is dependent upon the dimensions of the spare tire carrier and is 34 mm in the first embodiment. With the above values, the condition under which Eq. (2) becomes negative is given by $$\frac{9}{10} (1 - A + B) > 1 \tag{3}$$

where $$A = \frac{a(a + d \cos\phi)}{e^2}$$

$$B = \frac{ad \sin\phi \, (e^2 + c^2 - b^2)}{e^2 \sqrt{4b^2 e^2 - (e^2 + b^2 - c^2)^2}}.$$

Substituting suitable values $\phi$ and $c$, we may obtain the value of $b$. In the first embodiment, $c = 30$ mm and $\phi = 135°$. Therefore, $$e^2 = 1012$$

$$A = -0.066, \text{ and}$$

$$B = \frac{145 - 0.076 \, b^2}{\sqrt{-b^4 - 3822 \, b^2 - 12{,}627}} \tag{4}$$

Substituting A and B in Eq. (3) and consolidating, we have $$0.067 + B > 1/9$$

Hence, $$B > 0.0452 \tag{5}$$

Combining Eqs. (4) and (5) and solving for $b$, we have $$b < 30.6 \text{ or}$$

$$b > 53.7$$

In the first embodiment, in order to provide as great pilgrim-step motion as possible, the inventor selected $b = 29$. Thus, in the first embodiment, $a = 3.2$ mm $b = 29$ mm $c = 30$ mm, and $d = 34$ mm.

Figure 15:
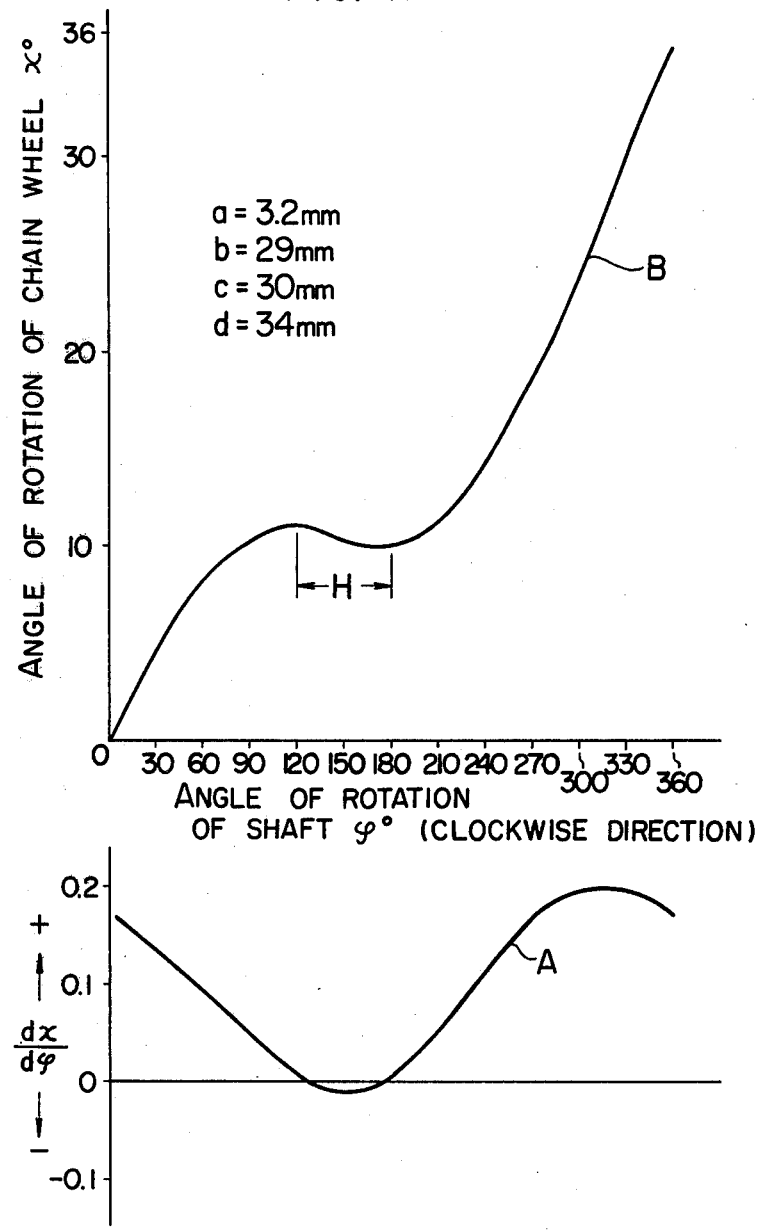

In FIG. 15, the curve B indicates the relationship between the angle $\phi$ of rotation of the eccentric cam (that is, the angle of rotation of the shaft) and the angle $\chi$ of the internal gear (that is, the angle of rotation of the chain wheel), and the curve A indicates $d\phi/d\chi$.

Figure 16:
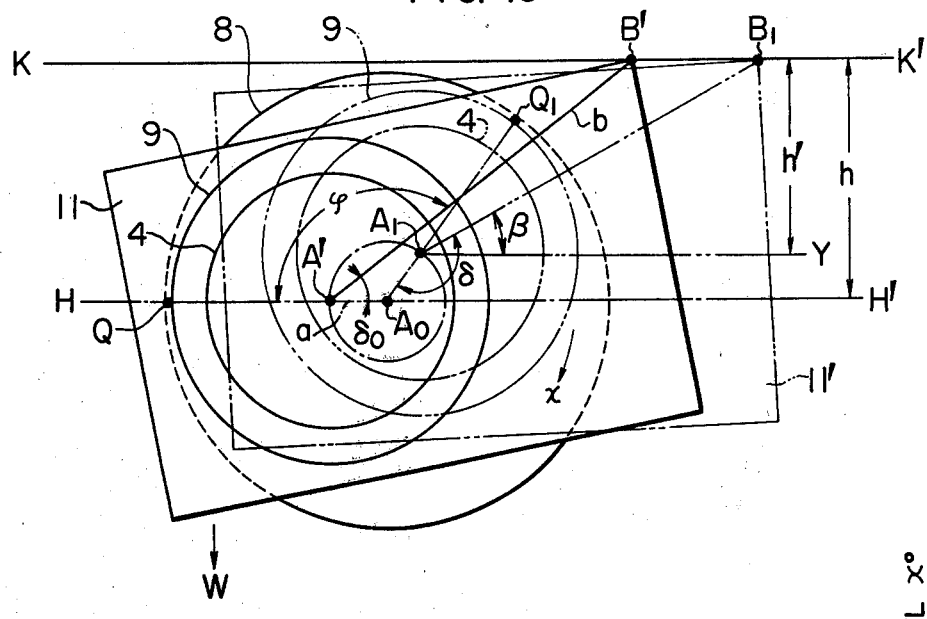
FIGS. 16 and 17 are the views used for the explanation of the underlying principle of the fifth embodiment of the present invention.
Figure 17:
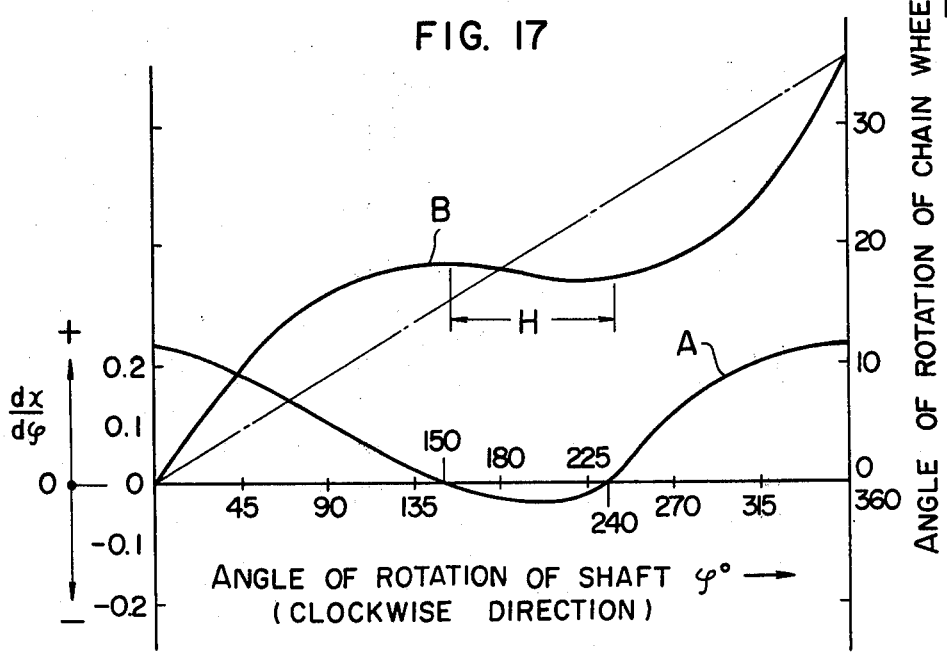

Next referring to FIGS. 16 and 17, the underlying principle of the fifth embodiment in accordance with the present invention described with reference to FIG. 11 will be described hereinafter. In FIG. 16, a plane HH' contains the center Ao of rotation of the eccentric cam 4 and the chain wheel 6 and is in parallel with the upper inner surface of case 1 or sliding surface K–K' with which the point B' of the rocking plate 11 is made into contact, and is spaced apart from the sliding surface K–K' by $h$. The distance or length of the line connecting the point B' and the center A' of the external gear 9 as well as the eccentric cam 4 when the latter is contained in the parallel plane H–H' is $b$, and let $<AoA'B' = \delta o$. When the eccentric cam 4 is rotated about the center Ao through $\phi$ in the clockwise direction, the center A' is displaced to the point $A_1$ while the point B', to the point $B_1$, and let $<AoA_1B_1 = \delta$. The distance between the sliding surface K–K' and a straight line $\overline{A_1 Y}$ passing through the point $A_1$ in parallel with the plane H–H' is $h'$.

When the eccentric cam 4 is rotated through $\phi$ so that the point of mesh between the external and internal gears 9 and 8 is displaced from the point Q to the point $Q_1$, the angle $\chi$ of rotation in the clockwise direction of the internal gear 8 or chain wheel 6 is given by $$\chi = \phi - n_2/n_1 (\delta - \delta o) \tag{6}$$

as with the case of the first embodiment described elsewhere with reference to FIG. 14.

From FIG. 16, $$h' = h - a \sin\phi$$

$$\sin \delta o = h/b$$

Hence, $$\delta o = \sin^{-1} h/b \tag{i}$$

From $$\sin \beta = \frac{h - a \sin\phi}{b} \tag{ii}$$

$$\beta = \sin^{-1} \frac{h - a \sin\phi}{b}$$

$$\delta = \phi + \beta = \phi + \sin^{-1} \frac{h - a \sin\phi}{b}$$

Substituting Eqs. (i) and (ii) in Eq. (6), we have $$\chi = \phi - \frac{n_2}{n_1} \left( \phi + \sin^{-1} \frac{h - a \sin\phi}{b} - \sin^{-1} \frac{h}{b} \right) \tag{7}$$

Differentiating Eq. (7), we have $$\frac{d\chi}{d\phi} = 1 - \frac{n_2}{n_1} \left( 1 - \frac{a \cos\phi}{\sqrt{b^2 - (h - a \sin\phi)^2}} \right) \tag{8}$$

As with the case of the first embodiment (see Eq. (2)), at the angle $\phi$ which makes Eq. (8) negative, the direction of rotation of the chain wheel 6 or internal gear 8 is opposite to that of the eccentric cam 4 so that the pilgrim-step motion is produced. In the fifth embodiment, $a = 3.2$ mm, $n_1 = 10$ and $n_2 = 9$. Substituting these values in Eq. (8) and solving for $\phi$ which makes Eq. (8) negative, we have $$1 - \frac{9}{10}\left[1 - \frac{3.2\cos\phi}{\sqrt{b^2 - (h - 3.2\sin\phi)^2}}\right] < 0$$

$$\therefore -9 \times 3.2\cos\phi > \sqrt{b^2 - (h - 3.2\sin\phi)^2}$$

Hence, $$b^2 - h^2 + 6.4\, h\sin\phi < 830\cos^2\phi + 10\sin^2\phi \quad (9)$$

Substituting $\phi = 210°$ and $h = 37.5$ and $39.5$ in Eq. (9) and solving for $b$, we have $b < 44.5$ when $h = 37.5$, and $b < 45.5$ when $h = 39.5$.

In the fifth embodiment, when $h = 39.5$, the pilgrim-step motion is produced at $b = 45.5$ and $\phi = 210°$. In FIG. 17, the curve A indicates the relationship between the angle $\phi$ of rotation of the shaft and $d\chi/d\phi$. It is seen the pilgrim-step motion may be attained when the angle $\phi = 150°$ to $240°$. The curve B shows the relationship between the angle $\phi$ of rotation of the shaft and the angle $\chi$ of rotation of the chain wheel 6. It is seen that the direction of rotation of the chain wheel 6 is opposite to that of the shaft 2 over the range indicated by H. In FIG. 16, the eccentricity $a$ is exaggerated for the sake of explanation.

Next referring to FIGS. 18 through 21, the underyling principle of the sixth embodiment in accordance with the present invention described with reference to FIG. 12 will be described hereinafter. As with the case of the first embodiment, Ao denotes the center of rotation of the internal gear 8 formed integral with the chain wheel 6; A', the center of the eccentric cam 4 with the eccentricity $a$ and the center of the external gear 9 slidably fitted over the eccentric cam 4 so that when the eccentric cam 4 rotates about the center Ao, the center A' of the eccentric cam 4 revolves along the circle whose center is Ao and whose radius is $a$. The center A' of the external gear 9 which is slidably fitted over the eccentric cam 4 and which is in mesh with the internal gear 8 at the point Q, revolves along the circle whose radius is $a$ and rotates about the center A'. The rocking plate 11 in unison with the external gear 9 revolves about the center Ao, and rocks about the axis Bo of the pin 16.

Let consider four-bar linkage with four joints Ao, A', B' and Bo and four links $a$ $b$, $c$ and $d$ drawn on the rocking plate 11. The link $d$ is a fixed link; the link $a$ is rotatable about the joint Ao; the link $c$ is rotatable about the joint Bo which is a sliding joint; both the links $a$ and $b$ are rotatable about the joint A'; the links $b$ and $c$ are fixedly connected to each other at the joint B' in such a way that they always make a right angle; and the external gear 9 is fastened to the link $b$. When the link $a$ rotates through $\phi$ from the position AoA' to the position AoA$_1$, the link $b$ moves from the position $\overline{A'B'}$ to the position $\overline{A_1B_1}$, and the angle between the links $a$ and $b$ changes from $\rho$ to $(\rho + \delta)$. ($<$B'A'Bo $= \rho$, $\rho = $ const.) The link $c$ moves from the position $\overline{B'Bo}$ to the position $\overline{B_1BoZ}$ ($\overline{B_1Z} = c$). Let $\theta$ denote the angle between the line $\overline{A_1B_1}$ and the line $\overline{A_1Y}$ drawn from the point $A_1$ in parallel with the line $\overline{AoA'}$.

Figure 18:
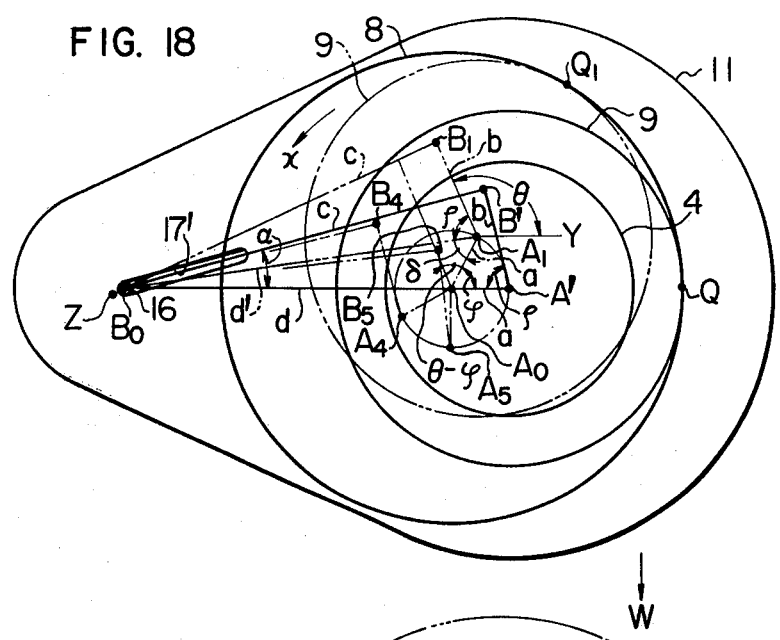
FIGS. 18 through 21 are views used for the explanation of the sixth embodiment of the present invention.

From FIG. 18, $$d\cos(\pi - \theta) - a\cos(\theta - ) = b \quad (10)$$

$$\theta + \rho + \delta - \phi = \quad (11)$$

If the external gear 9 is not rotated about its own axis and its point of engagement with the internal gear 8 is displaced from Q to $Q_1$ when the link $a$ is rotated through $\phi$ in the counterclockwise direction, the internal gear 8 is rotated also through $\phi$. However, the link $b$ rotates through $\delta$ with respect to the link $a$ so that the internal gear 8 is caused to be rotated through $n_2/n_1\delta$ in the clockwise direction with respect to the link $a$. Therefore, the angle $\chi$ of rotation of the internal gear 9 is given by $$\chi = \phi - n_2/n_1\delta \quad (12)$$

wherein $n_1 = $ number of teeth of the internal gear, and
$n_2 = $ number of teeth of the external gear 9.

Solving Eq. (10) for $\tan\theta$, we have $$(b^2 - a^2\sin^2\phi)\tan^2\theta - 2aK\sin\phi\tan\theta + b^2 - K^2 = 0$$

Therefore $$\tan\theta = \frac{aK\sin\phi - \sqrt{a^2K^2\sin^2\phi + (a^2\sin^2\phi - b^2)(b^2 - K^2)}}{b^2 - a^2\sin^2\phi} \quad (13)$$

where $$K = d - a\cos\phi$$

Differentiating Eq. (10) with respect to $\phi$, we have $$\frac{d\theta}{d\phi} = \frac{a\sin(\theta - \phi)}{d\sin\theta + a\sin(\theta - \phi)}$$

Differentiating Eq. (11) with respect to $\phi$, we have $$\frac{d\delta}{d\phi} = \frac{d\sin\theta}{d\sin\theta + a\sin(\theta - \phi)}$$

Differentiating Eq. (12) with respect to $\phi$, we have $$\frac{d\chi}{d\phi} = 1 - d\frac{n_2}{n_1}\frac{\tan\theta}{d\tan\theta + a\cos\phi\tan\theta - a\sin\phi} \quad (14)$$

As will the case of the first embodiment, at the angle $\phi$ which makes Eq. (14) negative, the direction of rotation of the internal gear 8 is opposite to that of the link $a$ so that the pilgrim-step motion is produced. The eccentricity $a$ and the distance between the points Ao and Bo are dependent upon the size of a spare tiere carrier. Therefore when the suitable values of $b$ and $\phi$ are substituted in Eqs. (13) and (14) in such a way that the value $b$ which makes Eq. (14) negative may be selected as the length of the link $b$, the four-bar linkage may produce the pilgrim-step motion. In the instant embodiment, $a = 3.2$ mm, $d = 35$ mm and $b = 25$ mm are selected. Therefore when $\phi = 210°$, $K = 37.8$ and $\tan\theta = 0.74$ or $-0.9$; that is, $\theta = 37°$ or $-42°$ are resulted. In the instant embodiment, $\theta$ is always greater than $\pi/2$ but is less than $\pi$ so that the only solution is $\theta = -42° = 180° - 42° = 138°$. In the vicinity of $\phi = 210°$, as the link $b$ rotates in the clockwise direction as indicated by $\overline{A_4B_4}$ and $\overline{A_5B_5}$ in FIG. 18, the negative sign is selected in the right side of Eq. (12). Therefore when $\theta = 138°$, $$d\chi/d\phi = 1 - 1.034 = -0.034.$$

Figure 20:
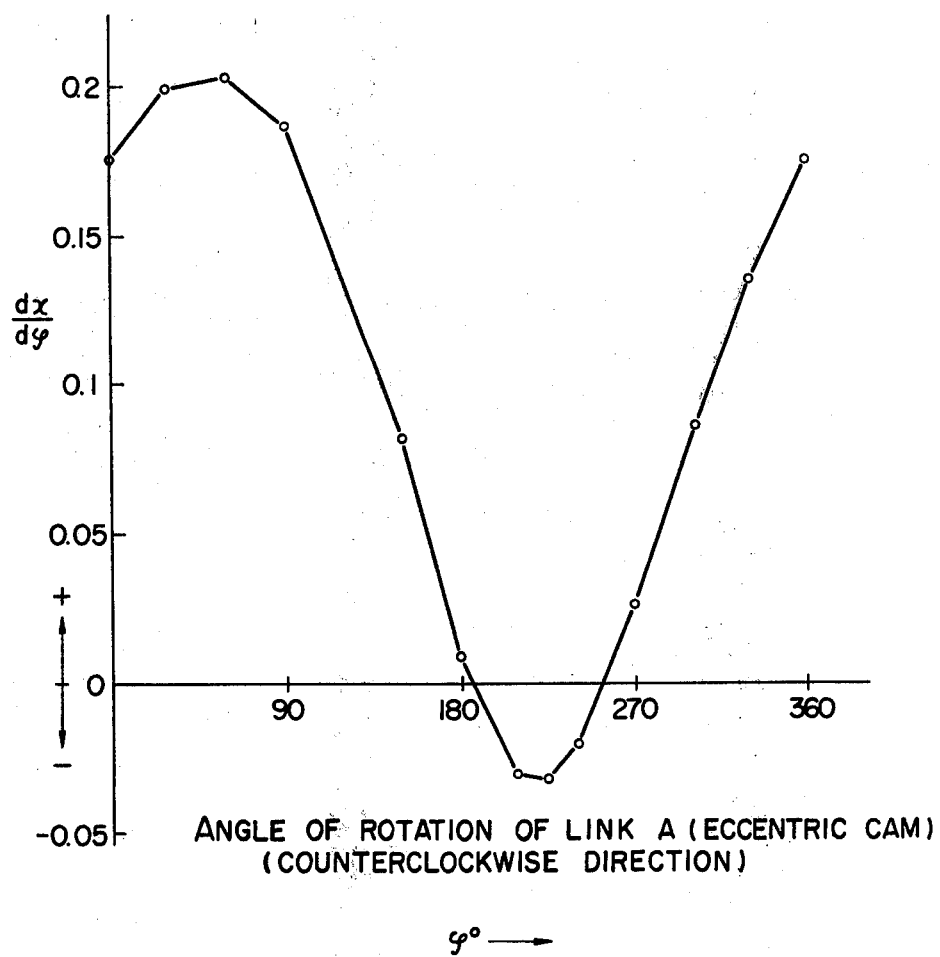

This means that this link makes the pilgrim-step motion in the vicinity of $\phi = 210°$. In FIG. 20, the angle $\phi$ of rotation of the link $a$ with respect to $d\chi/d\phi$ is shown. It is seen that pilgrim-step motion is produced over the range of the angle $\phi$ between 180° and 270°. So far the imaginary four-bar linkage with the links $a$, $b$, $c$ and $d$ on the rocking plate 11 has been described as being capable of producing the pilgrim-step motion, and the reason why the rocking plate 11 makes the motion similar to that of the four-bar linkage with the links $a$, $b$, $c$ and $d$ when the pin 16 is slidably fitted into the straight guide slot 17' whose longitudinal axis $\overline{B_0B'}$ makes the angle $\alpha$ with respect to the line $\overline{A_0B_0}$ follows. The imaginary links $a$, $c$ and $d$ and the joints A' and B' are all fixed on the rocking plate 11, and the position as well as the direction of motion of the link $b$ whose length is constant change from time to time. At the point A', the link $b$ is represented by the imaginary straight line $\overline{A'B'}$ which makes the angle $p$ with the link $a$, and at the point $A_1$, the link $b$ is represented by the imaginary line $\overline{A_1B_1}$ which makes the angle $(p + \delta)$ with the link $a$. That is, instead of permitting the free rotation of the links $b$ and $a$ at the points A' and $A_1$, it suffices to draw the imaginary lines $\overline{A'B'}$ and $\overline{A_1B_1}$. As to the link $c$, it corresponds to the line $\overline{B_0B'}$ which circumscribes a circle whose center is A' and whose radius is $b$ and also to the line $\overline{B_0B_1}$ which circumscribes a circle whose center is $A_1$ and whose radius is $b$. Thus, the rocking plate 11 may make the same motion with the four-bar linkage with the links $a$, $b$, $c$ and $d$ when the pin 16 is slidably fitted into the guide slot 17' whose longitudinal axis makes the angle $\alpha$ with the line $\overline{B_0A_0}$.

Figure 19:
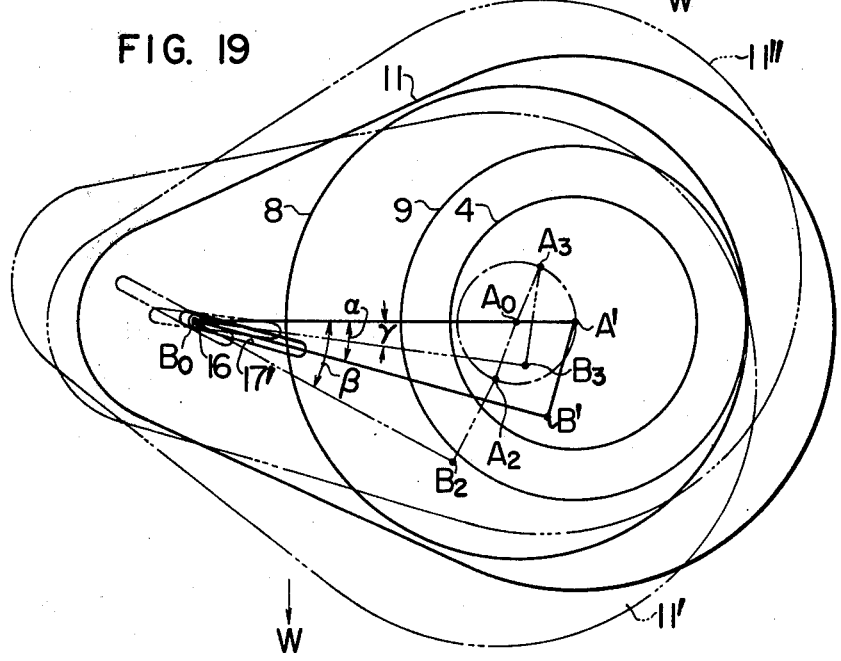

Next the method for selecting the angle $\alpha$ will be described. In FIG. 19, the point B' is located below the link $d$ and the link $a$ is rotated in the clockwise direction so that the motion opposite to that obtained by the arrangement shown in FIG. 18 may be produced. In FIG. 19, when the point A' is located at $A_2$, the point B' is located at $B_2$, the lowest position in the figure. When the point A' is located at $A_3$, the point B' is located at $B_3$, the uppermost position in the figure. Let $\beta$ denote the angle between the line $\overline{A_0B_0}$ and the line $\overline{B_2B_0}$, $\alpha$ the angle between the lines $\overline{A_0B_0}$ and $\overline{B'B_0}$ and $\gamma$ the angle between the lines $\overline{A_0B_0}$ and $\overline{B_3B_0}$. Then, the angle $\alpha$ of the guide slot 17' which permits the pilgrim-step motion is within the range $(\beta - \gamma)$, and is most preferably $$\frac{\beta + \gamma}{2}$$

from the theoretical standpoint. In practice, the angle $\alpha$ is selected for the sake of simplicity in design. The angle of the guide slot 17 refers to the angle between the line $\overline{A_0B_0}$ and the longitudinal axis of the guide slot 17', and in FIG. 19, the two-dot chain line 11' and the three-dot chain lines 11" indicate the positions of the rocking plate 11 when the joint A' is displaced to the points $A_2$ and $A_3$, respectively. For the sake of convenience of explanation, the length of the link $a$ is exaggerated in both FIGS. 18 and 19 so that the angle $\alpha$ is smaller than the actual angle. In the instant embodiment, $a = 3.2$ mm, $d = 35$ mm and $b = 25$ mm, and $\alpha = 40°$.

Figure 21:
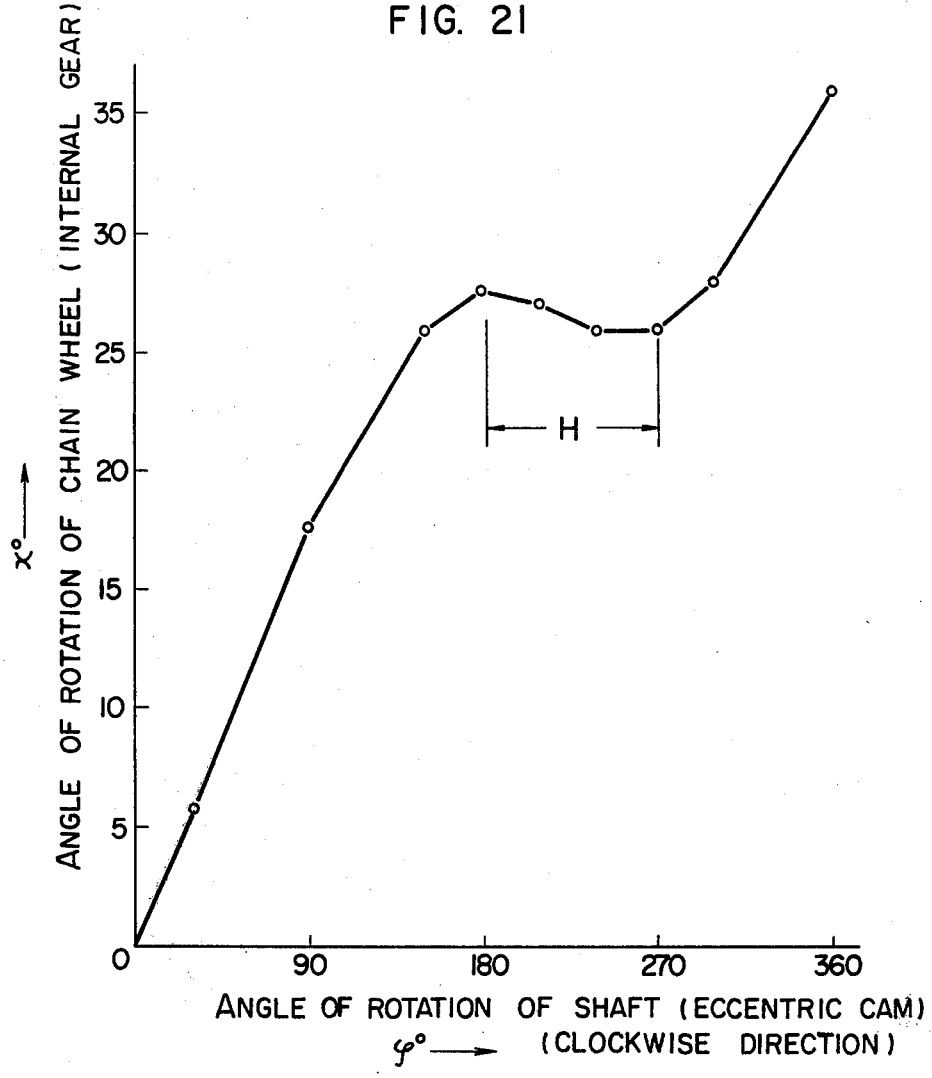

From Eq. (12) the angle $\chi$ of rotation of the internal gear 8 may be derived from the angle $\phi$ of rotation of the eccentric cam (that is, the link a). FIG. 21 shows the relationship between $\chi$ and $\phi$ when the shaft or eccentric cam is rotated in the clockwise direction from the point A' in FIG. 19, opposed to the arrangement shown in FIG. 18. The remarkable pilgrim-step motion is observed over the range of the angle $\phi$ of rotation between 180° and 270°. The underlying principles of the instant embodiment of the present invention may be explained in various manners, and there will be various methods for selecting the angle of the straight guide slot 17', but only one example thereof has been described in this specification.

Next the mode of operations of the preferred embodiments of the present invention based upon the above explained underlying principles will be described. In the first embodiment shown in FIGS. 1, 2 and 3, a handle not shown is inserted into the handle engaging portion 3 so as to rotate the shaft 2 in the clockwise direction in FIG. 2. Since one end B' of the rocking plate 11 which is fixedly engaged with the external gear 9 which in turn is slidably fitted over the eccentric cam 4 is pivoted to the link 13 and is not permitted to rotate, the external gear 9 rotates reciprocally about the center Ao of rotation, causing the rotation at reduced speed in the winding direction of the internal gear 8 in mesh with the teeth 10 of the external gear 9, whereby the chain 7 is lifted. As described hereinbefore, the distance between the center A' of the eccentric cam and one end B' of the rocking plate 11 as well as the length of the link 13, the distance between the center Ao of rotation of the shaft 2 and the lower pivot point Bo of the link 13, and the eccentricity are selected so that the pilgrim-step motion may be produced, the chain wheel 6 makes the pilgrim-step motion as indicated by the curve B in FIG. 15 during the winding up operation of the chain 7. That is, referring particularly to FIG. 15, until the shaft is rotated through 90°, the chain 7 is wound at a rate higher than the gear ratio between the internal and external gears 8 and 9, but from 120° to 180° indicated by H in FIG. 15, the chain 7 is rewound. When the angle of rotation exceeds 220°, the chain 7 is wound at a rate higher than the gear ratio between the internal and external gears. That is, the pilgrim-step motion is produced over the range between 120° and 180°. Therefore, the length of the chain 7 is so selected that when the center A' of the eccentric cam 4 is rotated from the point A' in FIG. 2 through about 150° in the clockwise direction, the spare tire (not shown) may be securely held in position. Then, even when the spare tire tends to fall due to the vibration or the like during the travel of the vehicle, it cannot fall below the bottom of the concave downward portion H in FIG. 15. That is, it must be once raised on the way of downward movement in order that it can fall off from the spare tire carrier. Thus, the spare tire can be positively prevented from falling off from the carrier. When the spare tire is held in position, the position of the center A' of the eccentric cam 4 is not necessarily located at the angular position of 150°. The reason is that when the eccentric cam 4 makes one rotation, the chain wheel 6 makes 1/10 rotation and passes the pilgrim-step motion region H so that the chain wheel 6 cannot make the rotation through greater than 36°. When the chain wheel 6 makes 1/10 rotation or the rotation through 36°, the downward lift of the spare tire is of the order of a few milimeters at the most and is less than the compression exerted to the spare tire in order to securely hold it in position. The steps for lifting the spare tire are reversed when the spare tire is lowered.

As described above, in the first embodiment, in order to permit the revolution of the external gear 9 but to prevent the rotation thereof, one end B' of the rocking plate 11 which is rotated in unison with the external gear 9 is pivoted with the bolt 14 to the lnk 13 which in turn is pivoted to the case 1 at Bo, but the second embodiment and so on are different from the first embodiment only in that the means for preventing the rotation of the external gear 9 is different. Therefore, in the explanation of the mode of operation of the second embodiment and so on, only the means for preventing the rotation of the external gear 9 will be described, and the explanation of the movements similar to those of the first embodiment shall not be made.

In the second and third embodiments, the pin 16 extended from the rocking plate 11 or the case 1 at the point B' is slidably fitted into the arcuate guide slot 17 formed through the case 1 or the rocking plate 11 in order to prevent the rotation of the external gear 9.

In the fourth embodiment, the rocking plate 11 is not provided, but the pin 16 is extended from the external gear 9 at the point B' and is fitted into the arcuate guide slot 17 formed through the case 1 in order to prevent the rotation of the external gear 9.

In the fifth embodiment, one end B' of the rocking plate 11 is normally pressed against the upper inner surface of the case 1 under the load W so that the rotation of the rocking plate 11 is prevented. As a result, the rotation of the external gear 9 is prevented. When the eccentric cam 4 makes one rotation, one end B' is reciprocated over the surface K-K' over the distance equal to the twofold of the eccentricity.

In the sixth and seventh embodiments, the pin 16 extended from the point Bo of the case 1 or rocking plate 11 is slidably fitted into the straight guide slot 17' formed through the rocking plate 11 or case 1 and inclined at the angle α, whereby the rotation of the external gear 9 is prevented.

Figure 22:
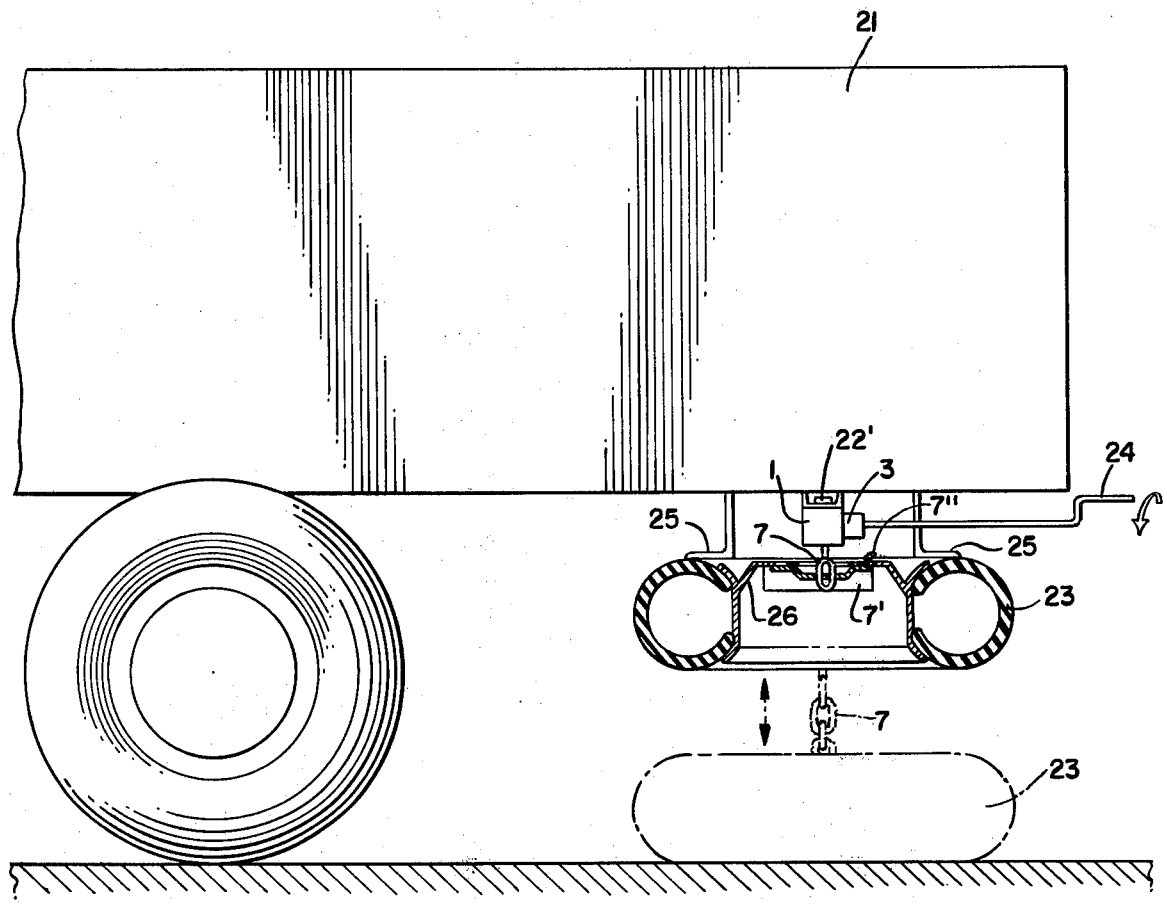
FIG. 22 shows a side elevational view of a vehicle body having tire carrier in sectional view assembled thereon.
Figure 23:
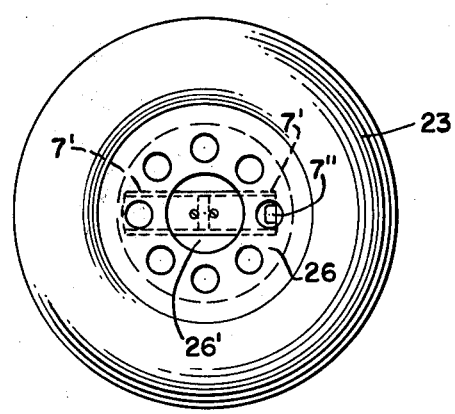
FIG. 23 shows a top plan view of spare tire and wheel with the carrier of the present invention assembled therewith.

Looking at FIGS. 22 and 23 it will be readily appreciated in one form of the present invention, the spare tire carrier 1 according to the invention is securely fixed beneath the rear portion of a vehicle body 21, such as a truck, by means of bolts 22 or the like. As stated in the specification with reference to FIGS. 1 and 2, the spare tire holding device 7' is attached to the lower end of the chain 7 which is suspended from the chain wheel 6.

To use carrier 1 the chain 7 is extended to the ground, the holding device 7' is passed through the center opening 26' of the wheel disc 26 of a spare tire 23 located on the ground while holding the holding device 7' vertically, and thereafter the holding device 7' is turned horizontally and coupled to the wheel disc 26 by inserting the projection 7'' into one of the holes arranged circumferentially on the disc as shown in FIG. 23. Next, a jack handle 24 is engaged with the handle engaging portion 3 of the shaft 2 shown in FIG. 1 and rotated to wind up the chain 7 to lift the spare tire 23 up to a position in which the spare tire 23 is brought into abutting relation against an abutment surface on a retainer 25 which encircles the spare tire carrier 1 and fixed beneath the vehicle body 21. After the spare tire 23 is securely held in position under the vehicle body 21, the jack handle 24 is withdrawn from the handle engaging portion 3. The chain wheel 6 makes one pilgrim-step motion during every one rotation of the jack handle 24 and one pilgrim-step motion of the chain wheel results in the downward lift of the spare tire 23 of the order of a few milimeters as stated in the specification. Therefore, if the phase of the chain wheel is adjusted to make the final pilgrim-step motion in the final stage of lifting operation of the spare tire 23 after the spare tire is compressed against the retainer 25 over the few millimeters, the spare tire 23 is held against the retainer 25 under some compression even after the jack handle 24 is withdrawn. In addition, even if a very great downward force is exerted to the tire held against the retainer 25, the chain 7 can never be rewound to drop the tire from the retainer 25, because the chain wheel 6 would be required to make the reversal pilgrim-step motion in order to rewind the chain 7 with further compressing the spare tire by at least a few millimeters. Therefore, however violently the vehicle vibrates in its running, the spare tire can be surely prevented from rattling and dropping out from the vehicle.

When the spare tire is required, the jack handle 24 is engaged again with the handle engaging portion 3 and rotated reversely to rotate the chain wheel over the pilgrim-step motion range so that the chain is rewound to lower the spare tire onto the ground where the spare tire is uncoupled from the spare tire holding device 7'. From the above it will be understood that the spare tire carrier according to the present invention may be advantageously used to hold a heavy spare tire in a narrow space under the vehicle body by merely rotating the jack handle to wind up to chain and to remove the tire by merely reversely rotating the jack handle to rewind the chain.

As described hereinbefore, the present invention is based upon the underlying principles which are the developments and improvements of the theory of the pilgrim-step motion of a four-bar linkage, and these developments and improvements are incorporated in the spare tire carriers utilizing the eccentric gear mechanism. The underlying principles as well as the calculations for design are complicated, but the spare tire carriers formed on the basis of the underlying principles are simple in construction yet very reliable and dependable in operation. And the present invention is an epoch-making invention which may positively prevent the rotation of the chain wheel in the direction of rewinding the chain, whereby the spare tire may be prevented from falling off from the spare tire carrier. Furthermore, as the theory of the pilgrim-step motion is applied to the eccentric gear mechanism, the spare tire may be readily lifted and mounted upon the vehicle body only by the step of rotating the shaft of the spare tire carrier with the use of a jack handle or the like in the direction of winding the chain, and the spare tire may be readily lowered only by the step of rotating the handle in the rewinding direction. Thus, the operation is very simple, and only the small force is required to lift the spare tire as the force may be multiplied.

What is claimed is:

1. A spare tire carrier for vehicles comprising
a casing,
a shaft having a handle engaging portion at one end thereof and rotatably carried by said casing,
an eccentric cam fastened to said shaft,
an external gear rotatably fitted over said eccentric cam, said external gear being not only rotatable about its axis but also revolvable about the center of said shaft, an internal gear rotatably mounted on said shaft and in mesh with said external gear, means for restricting the motion of said external gear such that as said shaft is rotated said external gear causes the pilgrim-step motion of said internal gear, means operatively connected to said internal gear for hoisting a spare tire into an abutting relationship against an abutment surface on said vehicle, said pilgrim-step motion being defined by such a motion that while said shaft is being rotated in one direction, said internal gear after it has been rotated through a predetermined angle is temporarily rotated in the direction opposite to that in which it has been rotated, thereby providing the locking effect between said tire and said abutment surface.

2. A spare tire carrier as set forth in claim 1 wherein said restricting means comprises a rocking plate fastened to said external gear for movement in unison therewith and a lever whose one end is pivoted to said rocking plate and whose the other end is pivoted to said casing, and the relationship among the distance between the center of said eccentric cam and said one end of said lever, the length between the pivot points of said lever, the distance between the center of said shaft and said the other end of said lever, the eccentricity of said eccentric cam and the gear ratio between said internal and external gears is so selected that said internal gear makes the pilgrim-step motion.

3. A spare tire carrier as set forth in claim 1 wherein said restricting means comprises a rocking plate fastened to said external gear for movement in unison therewith, a pin extended from said rocking plate or casing and an arcuate guide groove formed through said casing or rocking plate for slidably receiving therein said pin, and the relationship amont the position of said pin, the radius of said arcuate guide slot, the center thereof, the eccentricity of said eccentric cam and the gear ratio between said internal and external gears is so selected that said internal gear maks the pilgrim-step motion.

4. A spare tire carrier as set forth in claim 1 wherein said restricting means comprises a pin extended from said external gear and an arcuate guide slot formed through said casing for slidably receiving therein said pin, and the relationship among the distance between the center of said eccentric cam and the center of said pin, the radius of said arcuate guide slot, the distance between the center of said shaft and the center of said arcuate guide slot, the eccentricity of said eccentric cam and the gear ratio between said internal and external gears is so selected that said internal gear makes the pilgrim-step motion.

5. A spare tire carrier as set forth in claim 1 wherein said restricting means comprises a rocking plate fastened to said external gear for movement in unison therewith, and a guide surface formed on said casing and spaced apart from the center of said shaft for the sliding point contact with said rocking plate, and the relationship among the distance between the center of said eccentric cam and the point of contact between the rocking plate and said guide surface, the distance between the center of said shaft and said guide surface, the eccentricity of said eccentric cam and the gear ratio of said internal and external gears is so selected that said internal gear makes the pilgrim-step motion.

6. A spare tire carrier as set forth in claim 1 wherein said restricting means comprises a rocking plate fastened to said external gear for movement in unison therewith, a pin extended from said rocking plate or casing, and a straight guide slot formed through said casing or rocking plate for slidably receiving said pin, and the relationship among the distance between the center of said shaft and the center of said pin, the angle between the longitudinal axis or center line of said straight guide slot and the line connecting between the centers of said shaft and said pin, the eccentricity of said eccentric cam and the gear ratio between said internal and external gears is so selected that said internal gear makes the pilgrim-step motion.

* * * * *